United States Patent
Montalvo et al.

(10) Patent No.: US 8,712,356 B2
(45) Date of Patent: Apr. 29, 2014

(54) APPARATUS AND METHOD FOR PHASE SYNCHRONIZATION IN RADIO FREQUENCY TRANSMITTERS

(75) Inventors: Antonio Montalvo, Raleigh, NC (US); Jianxun Fan, Apex, NC (US)

(73) Assignee: Analog Devices, Inc., Norwood, MA (US)

( * ) Notice: Subject to any disclaimer, the term of this patent is extended or adjusted under 35 U.S.C. 154(b) by 1023 days.

(21) Appl. No.: 12/777,412

(22) Filed: May 11, 2010

(65) Prior Publication Data

US 2011/0279147 A1    Nov. 17, 2011

(51) Int. Cl.
*H04B 1/16*    (2006.01)

(52) U.S. Cl.
USPC .......................................... 455/205; 455/208

(58) Field of Classification Search
USPC ........ 455/67.16, 67.11, 76, 42, 139, 25, 63.1, 455/63.4, 333, 141, 147, 208, 209, 255, 455/258, 315, 86, 205, 230
See application file for complete search history.

(56) References Cited

U.S. PATENT DOCUMENTS 5,162,763 A * 11/1992 Morris .......................... 332/170
5,355,393 A * 10/1994 Nyenhuis et al. ............. 375/344
7,418,244 B2    8/2008 Montalvo

OTHER PUBLICATIONS

Analog Devices, "AD9356: Integrated MIMO Transceiver," Jan. 2010, available at http://www.analog.com/en/rfif-components/rfif-transceivers/ad9356/products/product.html.
Analog Devices, "AD9356 Data Sheet," 2 pages, Jan. 2010.

* cited by examiner

*Primary Examiner* — Eugene Yun
(74) *Attorney, Agent, or Firm* — Knobbe, Martens, Olson & Bear, LLP (57) ABSTRACT

Apparatus and methods are disclosed related to phase synchronization in transmitters. One such apparatus includes a wireless transmitter with two or more separate and unrelated local oscillators. The apparatus can provide RF signals to multiple antenna elements, which can be implemented in systems such as beamforming systems or multiple input multiple output (MIMO) systems. A phase difference between local oscillators is determined using outputs of receivers. The phase difference can be used to adjust a phase of signals associated with one or more of the local oscillators, such that the phase of each signal provided to the multiple antenna elements can be aligned.

22 Claims, 6 Drawing Sheets

APPARATUS AND METHOD FOR PHASE SYNCHRONIZATION IN RADIO FREQUENCY TRANSMITTERS

BACKGROUND

1. Field

Embodiments of the invention relate to electronic systems, and more particularly, to phase synchronization in radio frequency transmitters in electronic systems.

2. Description of the Related Technology

Certain electronic systems can have multiple transmission paths for transmitting signals. In certain applications, phases of such signals need to be known and/or synchronized for the operation of the system. For example, a wireless communications system can have beam-forming capability by having multiple antenna elements. Such multiple antennas can be provided with signals having known phases, and such signals are added or subtracted to form a beam in a desired direction. Other wireless communications systems may use multiple antenna elements to increase a link margin. In such systems, aligning the phases of transmitted signals is desirable.

Conventional multiple transmission path systems can include a single local oscillator shared for generating signals for multiple transmission paths. However, sharing a single local oscillator can be undesirable or unfeasible in certain applications. For example, a system may require more transmitters than can be included on a single integrated circuit. As another example, in direct conversion transmitters, sharing a single local oscillator is undesirable because routing a carrier frequency signal on a printed circuit board is likely to result in carrier leakage at an output of the transmitter. Because of problems associated with sharing a single local oscillator, some transmitters include two or more integrated circuits with separate local oscillators. In such transmitters, it can be desirable to determine and/or align phases of signals generated using such separate local oscillators.

SUMMARY OF THE INVENTION

In one embodiment, an apparatus includes a local oscillator, a transmit path, and a receive path. The local oscillator can generate a local oscillator output signal, which can be received by the transmit path. The transmit path also has a phase control input. The transmit path can generate a first radio frequency (RF) output signal based at least partly on the local oscillator output signal, wherein a phase of the first RF output signal is controllable based at least partly on a control input provided to the phase control input. The receive path can receive the local oscillator output signal and a receive signal as inputs, wherein the receive signal is RF sampled from a second RF output signal. The receive path can generate a signal having a phase component that includes a relative phase difference between the first RF signal and the second RF signal as an output.

In another embodiment, a method includes generating a first RF signal in a transmission path based at least partly on a first local oscillator output signal. The method also includes providing an RF sample of the first RF signal to a receive path using a directional coupler. A first baseband signal in the receive path can be generated based at least partly on the RF sample of the first RF signal and a second local oscillator output signal, wherein the second local oscillator output signal and the first local oscillator output signal are generated from separate local oscillators. Using a processor, a relative phase difference can be derived between the first local oscillator output and the second local oscillator output based at least partly on the first baseband signal.

In another embodiment, an apparatus includes a local oscillator that can generate a local oscillator output signal. The apparatus also includes means for transmitting an RF signal having means for controlling a phase of the RF signal and means for upconverting a baseband signal to RF based at least partly on the local oscillator input. The apparatus further includes means for receiving a second RF signal having means for generating a signal with a phase component that includes a relative phase difference between the RF signal and the second RF signal.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed. As used herein, "electrically coupled" or "coupled" include coupling via radio frequency techniques.

DETAILED DESCRIPTION OF EMBODIMENTS

The following detailed description of certain embodiments presents various descriptions of specific embodiments of the invention. However, the invention can be embodied in a multitude of different ways as defined and covered by the claims. In this description, reference is made to the drawings where like reference numerals indicate identical or functionally similar elements.

As discussed above, an electronic system can include multiple transmission paths. For example, a wireless transmitter can have multiple transmission paths to provide signals (for example, radio frequency (RF) signals) having substantially the same frequency to multiple antenna elements. A misalignment in the phases of such signals can lead to undesirable effects, such as unwanted interference between at least some of the multiple antenna elements.

In certain applications, two or more separate and unrelated local oscillators can be used for processing signals to be provided through multiple transmission paths. Each of the local oscillators can have substantially the same frequency and a random phase that may not be aligned with the phase of the other local oscillators. The local oscillators can provide outputs for upconverting signals in the transmission path to substantially the same frequency. However, a signal provided by each of the multiple transmission paths can have a phase component that includes the random phase of the particular local oscillator associated with that particular transmission path. In the context of this document, a signal can maintain a phase component that includes a phase $\Phi$, provided that the phase $\Phi$ appears in a mathematical representation of the signal, even if the phase $\Phi$ is shifted or modified by an arithmetic operation such as addition, subtraction, multiplication, or division.

As a result of using separate and unrelated local oscillators that may not have the same phase, the multiple transmission paths may provide multiple antenna elements with signals that are not aligned. Accordingly, there is a need for detecting a phase difference between signals generated or processed by the separate and unrelated local oscillators. Such a phase difference can be used to synchronize the phase of the signals provided to the multiple antenna elements.

Overview of Wireless Transmitter with Multiple Antenna Elements

Figure 1:
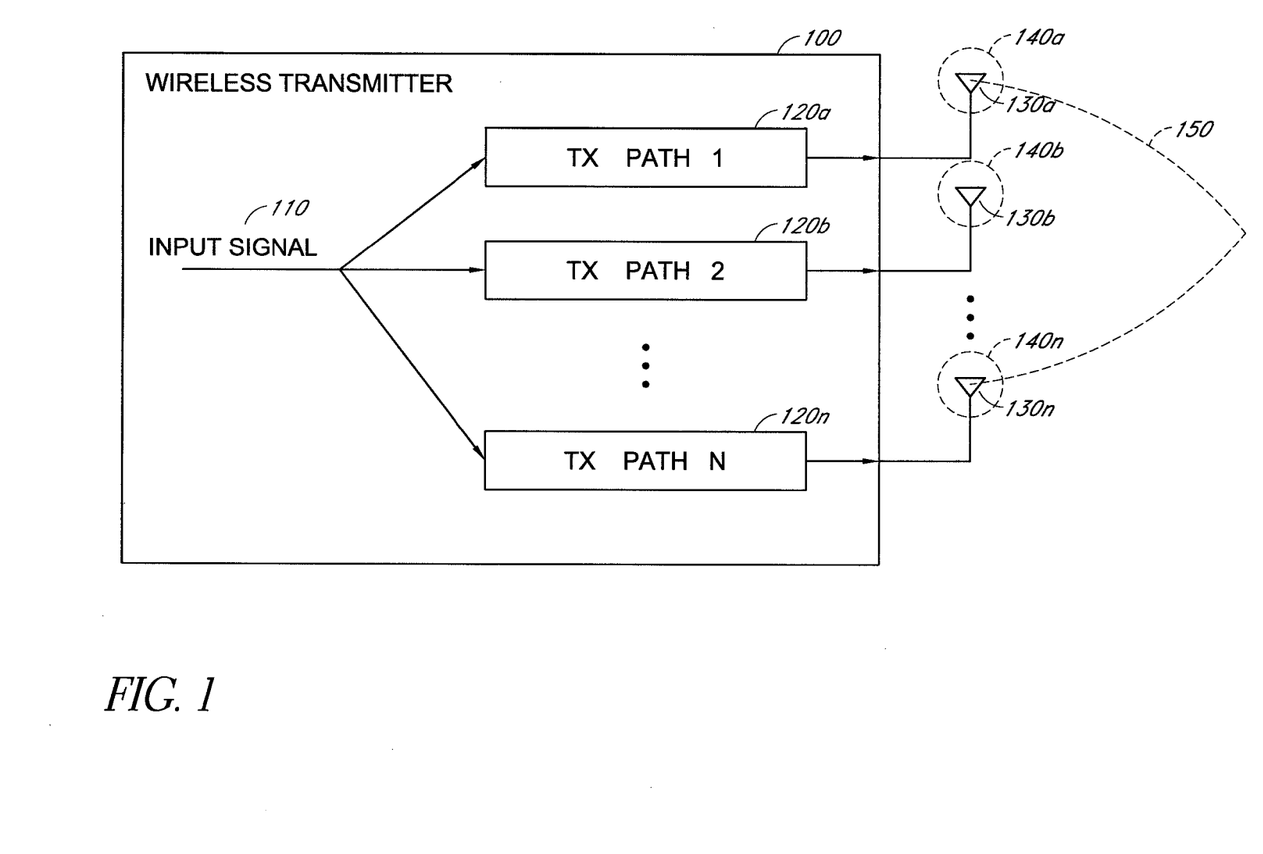
FIG. 1 is a block diagram illustrating a wireless transmitter with multiple transmission paths and multiple antenna elements.

Referring to FIG. 1, a wireless transmitter with multiple transmission paths will be described below. The principles and advantages of such a wireless transmitter can be applied to any transmitter, transceiver, or transmitter/receiver with multiple antenna elements. The wireless transmitter 100 serves to wirelessly transmit a signal through a medium, such as air. The signal can be an RF signal. The wireless transmitter 100 can be part of any electronic device. Wireless environments can include, without limitation, cell phones, cell phone base stations, wireless data networks, such as IEEE 802.11 (WiFi), IEEE 802.16 (WiMax), WCDMA (Wideband Code Division Multiple Access), LTE (Long Term Evolution), CDMA2000, GSM/EDGE (Enhanced Data rates for GSM Evolution), TD-SCDMA (Time Division Synchronous Code Division Multiple Access), satellite communications, and the like.

In the illustrated embodiment, the wireless transmitter 100 is configured to transmit a signal by forming a beam in a desired direction. Such a wireless transmitter can include N antenna elements and N transmission paths, where N is an integer greater than 1. The illustrated wireless transmitter 100 includes multiple transmission paths 120a-120n (including first to N-th transmission paths 120a-120n) configured to receive an input signal 110, and an array of antenna elements (including first to N-th antenna elements 130a-130n). The antenna elements 130a-130n can transmit first to N-th antenna element signals 140a-140n to form a directional beam 150. A skilled artisan will appreciate that one or more of the components of the wireless transmitter 100 can be implemented in one or more chips or integrated circuits.

Each of the transmission paths 120a-120n serves to receive the input signal 110. In one embodiment, the input signal 110 can be one or more data signals provided to the first to N-th transmission paths 120a-120n. The input signal 110 can represent a wide variety of data, including, but not limited to, audio data (for example, voice data), video data, and control data. In addition, the input signal 110 can be at baseband. In the illustrated embodiment, the same input signal 110 is provided to each transmission path 120a-120n. In other embodiments, different input signals can be provided to one or more of the transmission paths 120a-120n or any of the transmission paths described herein. For example, in embodiments that are not related to beamforming, it can be advantageous to provide different input signals to different transmission paths.

The transmission paths 120a-120n can process the data signals to provide a plurality of RF signals to the array of antenna elements 130a-130n. The multiple transmission paths 120a-120n can adjust properties of the data signals including, but not limited to, one or more of amplitude, phase, and frequency. Each of the transmission paths 120a-120n can provide an output signal representative of the input signals 110. The outputs of the first to N-th transmission paths 120a-120n are electrically coupled to the first to N-th antenna elements 130a-130n, respectively. For example, the first output signal is electrically coupled to the first antenna element 130a.

One or more of the transmission paths 120a-120n can be provided with separate local oscillators. Such local oscillators may not have the same phase as one another. In some embodiments, it is desirable to determine the phase of the output signal of each of the multiple transmission paths 120a-120n to allow one or more of the multiple transmission paths 120a-120n to adjust the phase of one or more of its associated output signals for alignment with the output signals of the other transmission paths.

In one embodiment, the phase component(s) of one or more of the output signals can be used to shift the phase of a local oscillator used for a transmission path. This can be implemented by providing a phase control input to the transmission path, which can be used to control the phase of one or more of the output signals. For example, the second transmission path 120b may include a local oscillator with a phase of $\Phi_2$, and the second transmission path 120b may include elements, such as a mixer, configured to adjust a phase of its output signal to be $\Phi_2-\delta$, where $\delta$ is between 0 to $2\pi$ radians or 0° to 360°. In some embodiments, $\delta$ can represent a difference between phases of the separate local oscillators. Because $\delta$ may not be a fixed value, advantageously, a variable phase shifter can be used. The variable phase shifter can be implemented by, for example, an LC circuit having a variable capacitance element or a one-shot multivibrator which is capable of varying its hold time. Alternatively or additionally, other types of suitable variable phase shifters that preserve frequency and amplitude can be used. Phase shifting can also be implemented in the digital domain by a processor, for example, any of the processors described below. The processor can phase shift a periodic signal by multiplying the periodic signal by $\exp(j^*(\Phi_2-\Phi_1))$, where $\Phi_2-\Phi_1$ can represent a relative phase difference. Such a processor can be included in one or more transmission paths. Alternatively or additionally, the processor can be implemented separate from the transmission paths.

Each of the antenna elements 130a-130n can individually output a transmission signal with a selected phase and amplitude. For example, the first antenna element 130a can output the first antenna element signal 140a. The first to N-th antenna element signals 140a-140n output by the antenna elements 130a-130n interfere with one another, and together form a directional beam 150 in a selected direction. The phases and amplitudes of the signals from the antenna elements 130a-130n can be controlled to direct the beam 150 in the selected direction. A receiver with multiple antenna elements can be combined in such a way that an expected pattern of signal reception is observed and the directional beam 150 can be processed using beam-forming techniques.

Phase Synchronization for Multiple Transmission Paths

In applications in which two or more separate and unrelated local oscillators are used to provide signals through multiple transmission paths, the phases of transmitted signals can be synchronized by determining a phase difference between the separate and unrelated local oscillators. A first signal having a phase component that includes a phase of a first local oscillator can be provided for processing, in which a phase component from a second local oscillator can be introduced. From a second signal having a phase component that includes the phase of the first local oscillator and the phase of the second local oscillator, a phase difference between the first local oscillator and the second local oscillator can be determined.

Figure 2:
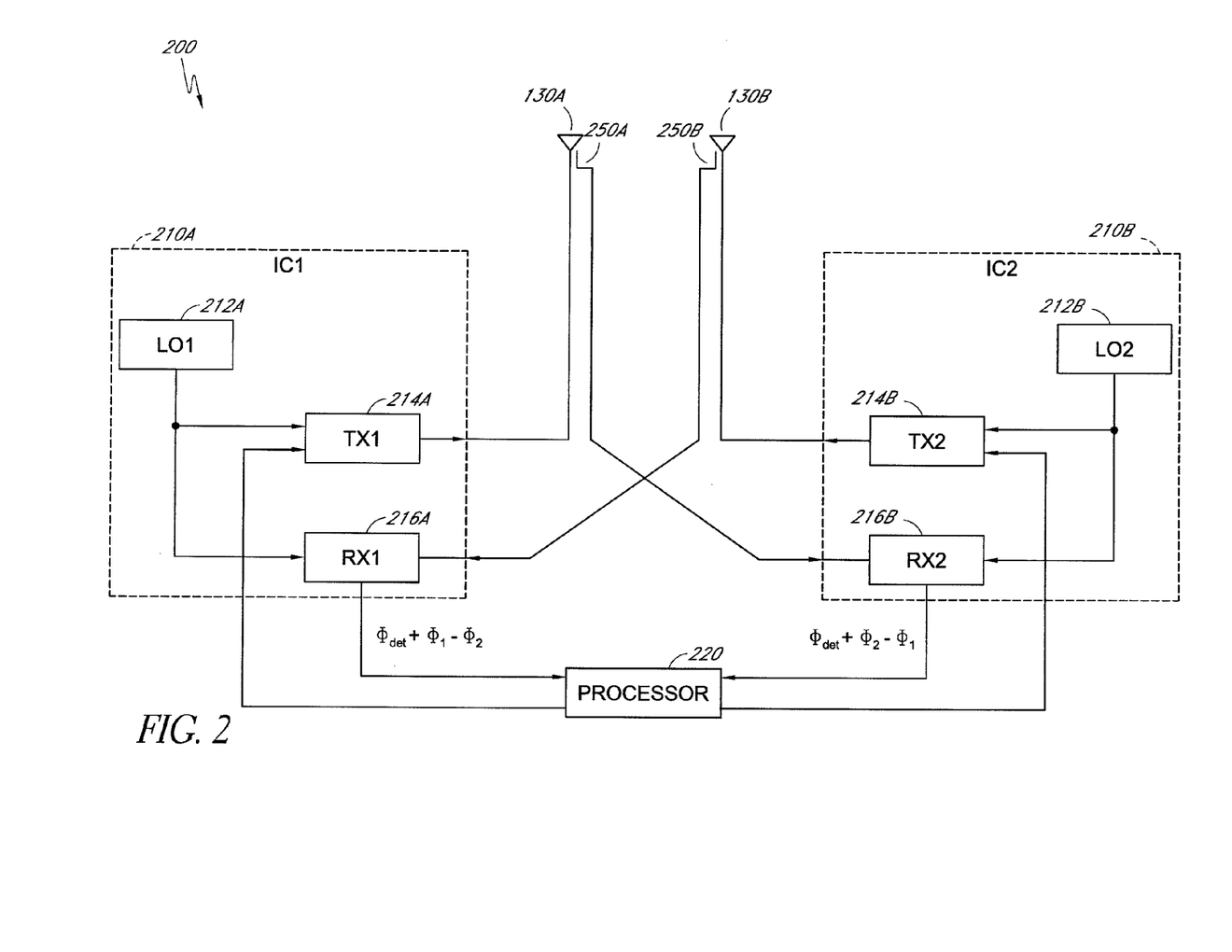
FIG. 2 is a block diagram of an embodiment of a wireless transmitter having separate local oscillators for multiple transmission paths and means for detecting the relative phases of the transmitted signals.

Referring to FIG. 2, a wireless transmitter according to one embodiment will be described below. The wireless transmitter 200 can determine a relative phase difference between two or more separate and unrelated local oscillators and use the relative phase difference to align the phase of RF signals generated by the wireless transmitted. The illustrated wireless transmitter 200 includes two separate integrated circuits, each with its own local oscillator. The wireless transmitter 200 includes a first integrated circuit 210a, a second integrated circuit 210b, a processor 220, a first antenna element 130a, a second antenna element 130b, a first directional coupler 250a, and a second directional coupler 250b. In one embodiment, the first integrated circuit 210a can include at least a portion of the first transmission path 120a of FIG. 1, and the second integrated circuit 210b can include at least a portion of the second transmission path 120b of FIG. 1.

The first integrated circuit 210a can include a first local oscillator 212a, a first transmission path 214a, and a first receiver 216a. The first local oscillator 212a serves to provide a periodic signal(s) to the first transmission path 214a for upconverting signals from baseband to RF. The first local oscillator 212a also serves to provide a periodic signal(s) to the first receiver 218a for downconverting an RF signal to baseband. In some embodiments, the first local oscillator 212a can provide two or more output signals that can be out of phase with each other. For example, in quadrature modulator systems, the first local oscillator can include a phase-shift circuit that serves to provide a quadrature (Q) signal that is $\pi/2$ radians or 90° out of phase with respect to an in-phase (I) signal having a phase $\Phi_1$ of the local oscillator. The phase $\Phi_1$ of the first local oscillator 212a can be random, and can be anywhere from between 0 to $2\pi$ radians, or 0° to 360°. The phase $\Phi_1$ can represent a difference in phase between a data signal and a signal generated by the first local oscillator 212a.

The first transmission path 214a can include any of the features of the transmission paths 120a-120n of FIG. 1. The first transmission path 214a can include one or more mixers that serve to upconvert one or more baseband signals (for example, the input signal 110 of FIG. 1), thereby creating RF signal(s). For example, the mixer can mix one of the baseband signals with a signal generated by the first local oscillator 212a. Such mixing can shift a phase of the data signal by the phase $\Phi_1$ of the first local oscillator 212a, in addition to modulating the baseband signal to RF. The first transmission path 214a can also shift the phase of the RF signal, using other components, such as an additional mixer or a phase-shift circuit. In addition, the first transmission path 214a can serve to amplify the RF signal before providing it to the first antenna element 130a. The amplified RF signal can have a phase component of $\Phi_1$. In some embodiments, the first transmission path 214a can output more than one RF signal. An output of the first transmission path 214a can be electrically coupled to the first antenna element 130a.

The receivers illustrated in FIG. 2 can receive RF signals. For example, a receiver can receive an RF sampled signal from a directional coupler, as illustrated in FIG. 2. In some embodiments, receivers can be designed such that they have a gain that is temperature and/or frequency independent. Receivers that are both temperature and frequency independent can advantageously be used as a power detector to detect a power of a transmitted signal or a received signal. In some embodiments, the receiver can be a linear receiver. In some embodiments, a baseband output of a linear receiver can be represented by the following equation: $V_{OUT}(t)=A_{RX}(t)*\exp(j*(\Phi_{RX}(t)+\Phi_{LO})*t)$, in which $A_{RX}(t)$ represents the amplitude of a received signal, $\Phi_{RX}(t)$ represents a phase of the received signal, and $\Phi_{LO}$ represents a phase of a local oscillator.

The first receiver 216a serves to receive an RF signal from an output of the second directional coupler 250b at its input and to downconvert the RF signal to baseband. For example, the receiver 216a can include a mixer that can mix the RF signal with a signal generated by the first local oscillator 212a to convert the frequency to baseband. In some embodiments, the first receiver 216a can include more than one receive path each having a separate mixer. For example, the first receiver can include two mixers, one for an I signal and one for a Q signal, and provide similar processing for signals in an I path and signals in a Q path.

Mixing the RF signal with the signal generated by the first local oscillator 212a can also shift the phase of the RF signal by the phase $\Phi_1$. The first receiver output can have a phase $\Phi_{Det}+\Phi_1-\Phi_2$, where $\Phi_{Det}$ represents a phase shift introduced by the delay of the RF signal from the second directional coupler 250b to the first receiver 216a, $\Phi_1$ represents a phase shift introduced by the first receiver 216a that downconverts the RF signal, and $\Phi_2$ represents a phase shift introduced by the second transmission path 214b that upconverts the input signal 110 to RF. An output of the first receiver 216a can be coupled to the processor 220. In one embodiment, the first receiver output signal can be a voltage signal.

In the illustrated embodiment, the second integrated circuit 210b is substantially the same as the first integrated circuit 210a. As such, corresponding parts can perform substantially the same function. The second integrated circuit 210b can include a second local oscillator 212b, a second transmission path 214b, and a second receiver 216b. Similar to the first local oscillator 212a, a phase $\Phi_2$ of the second local oscillator 212b can be random, and can be anywhere from between 0 to $2\pi$ radians or 0° to 360°. The phase $\Phi_2$ is unlikely to be the same as the phase $\Phi_1$ of the first local oscillator 212a.

The second transmission path 214b can provide a second output signal to the second antenna element 130b. The second transmission path 214b can upconvert an input signal from baseband to RF. An output of the second transmission path 214b is coupled to an input of the second antenna element 130b. The second output signal can have a phase component of $\Phi_2$.

An input of the second receiver 216b is coupled to an output of the first directional coupler 250a. The second receiver 216b serves to receive the RF signal from the first directional coupler 250a at its input and to downconvert the RF signal to baseband. The second receiver 216b can provide a second baseband output to the processor 220. The second baseband output can have a phase of $\Phi_{Det}+\Phi_2-\Phi_1$, where $\Phi_{Det}$ represents a phase shift introduced by the delay of the RF signal from the first directional coupler 250a to the second receiver 216b, $\Phi_2$ represents the phase shift introduced by downconversion of the RF signal, and $\Phi_1$ represents the phase shift introduced by the first transmission path 214a modulating a baseband signal to RF.

The first directional coupler 250a serves to RF sample a portion of the power that travels between the first transmission path 214a and the first antenna element 130a. The first directional coupler 250a provides the RF sampled portion of the power to the second receiver 216b. Similarly, the second directional coupler 250b serves to RF sample a portion of the power that travels between the second transmission path 214b and the second antenna element 130b. The second directional coupler 250b provides the RF sampled portion of the power to the first receiver 216a.

The processor 220 serves to perform computations on the first baseband output and the second baseband output. The processor 220 can be any suitable processor having computational capacity to process the output signals and determine a phase difference between the phase $\Phi_1$ of the first local oscillator 212a and the phase $\Phi_2$ of the second local oscillator 212b. The processor 220 can include, for example, a microprocessor, microcontroller, licensable core, digital signal processor, or the like. The processor 220 can store instructions stored in a tangible, non-transitory computer-readable medium. The processor 220 can also include one or more memories configured to store values associated with phases and phase components, such as in a lookup table (LUT). The processor 220 can also perform other operations for the first integrated circuit 210a and/or the second integrated circuit 210b. In one embodiment, the processor 220 can be separate from the first integrated circuit 210a and the second integrated circuit 210b. In an alternative embodiment, the processor 220 can be part of one or more of the first integrated circuit 210a and the second integrated circuit 210b.

In the illustrated embodiment, the processor 220 is electrically coupled to the output of the first receiver 216a and to the output of the second receiver 216b. The output of the first receiver 216a can have a phase component of $\Phi_{Det}+\Phi_1-\Phi_2$. The output of the second receiver 216b can have a phase component of $\Phi_{Det}+\Phi_2-\Phi_1$. The wireless transmitter 200 of FIG. 2 can be configured such that the delay of the output from the first directional coupler 250a to the second receiver 216b is substantially equal to the delay of the output from the second directional coupler 250b to the first receiver 216a. As a result, $\Phi_{Det}$ can be equal in the phase component of the output of the first receiver 216a and the phase component of the second receiver 216b.

For example, the processor 220 can determine the phase of the output of the first receiver 216a and the phase of the output of the second receiver 216b, and then subtract these phases and divide by 2 to determine the phase difference $\Phi_1-\Phi_2$. In certain embodiments with more than one receive path in each receiver (for example, an I path and a Q path in a QAM system), the first receiver 216a and the second receiver 216b can output signals to the processor 220 from corresponding receive paths. The processor 220 can provide a signal representative of the phase difference $\Phi_1-\Phi_2$ to the first integrated circuit 210a and/or the second integrated circuit 210b. The signal representative of the phase difference can be used to control the phase shift the first RF output signal provided to the first antenna element 130a. For example, the first transmission path 214a can include a phase shifter that receives the signal representative of the phase difference and shifts a phase of a signal in the first transmission path 214a by $\Phi_1-\Phi_2$. By shifting a signal with a phase of $\Phi_1$ by $\Phi_1-\Phi_2$, the resulting phase can be $\Phi_2$. Then the phase of the first RF output signal can be aligned with the phase of the second RF output signal. Alternatively, the signal representative of the phase difference can be used to control the phase shift the second RF output signal provided to the second antenna element 130b using substantially the same method. The phases of the first RF output and the second RF output can be synchronized by shifting either the first RF output signal or the second RF output signal. In another embodiment, the processor 220 can shift the phase of a local oscillator signal in the digital domain and provide one or more phase shifted local oscillator signals to the transmission path 214a and/or the transmission path 214b. The processor can implement phase shifting, for example, by multiplying a local oscillator signal by $\exp(j^*(\Phi_2-\Phi_1))$, where $\Phi_2-\Phi_1$ can represent the relative phase difference. In some embodiments, a processor that implements digital phase shifting can be included in the first transmission path 214a and/or the second transmission path 214b.

Figure 3:
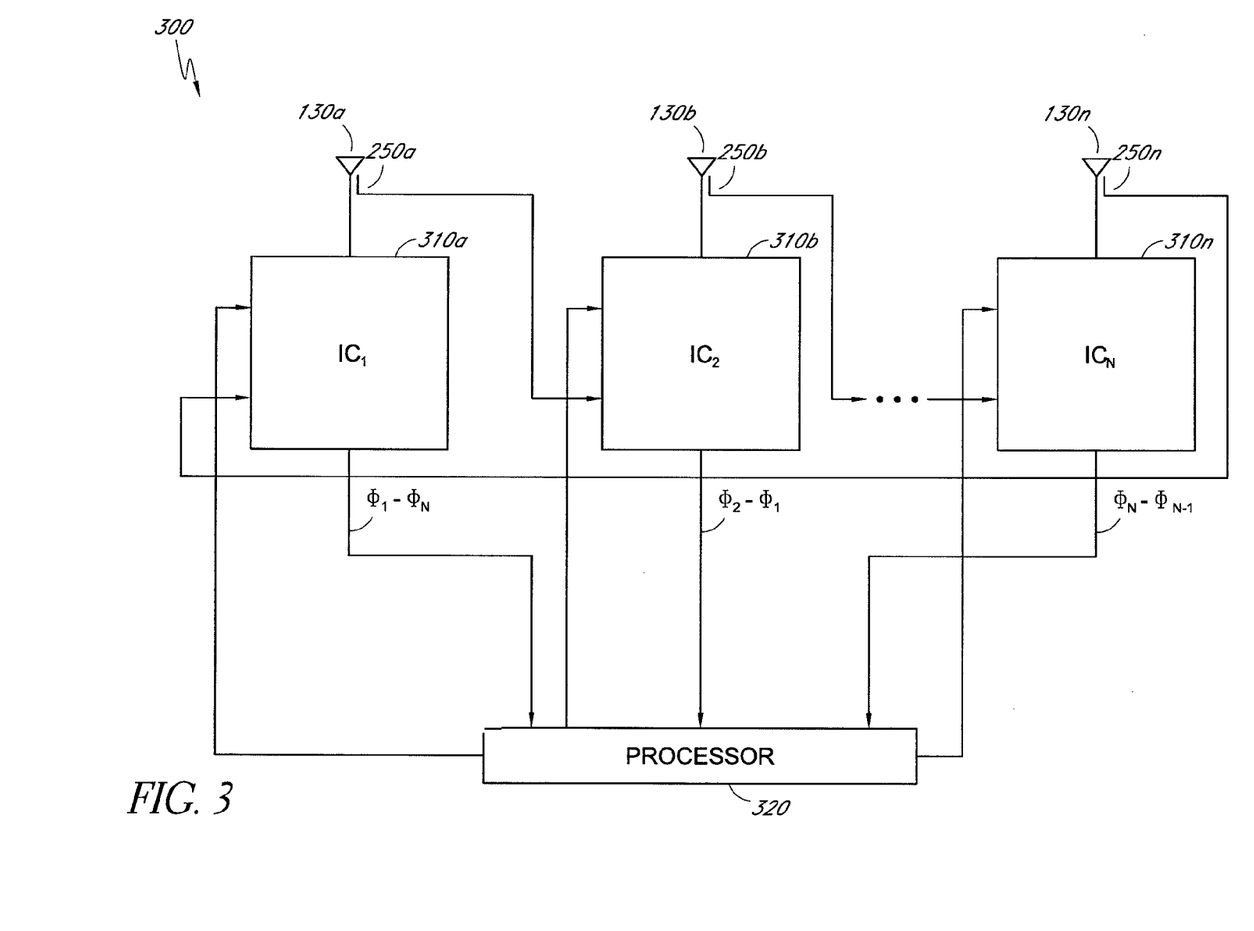
FIG. 3 is a block diagram of another embodiment of a wireless transmitter having separate local oscillators for multiple transmission paths.

The principles described in reference to FIG. 2 can be applied to more than 2 integrated circuits with separate local oscillators having different phases. FIG. 3 illustrates a more general case with N integrated circuits, where N is an integer greater than 2, each with a separate local oscillator having a different phase.

Referring to FIG. 3, a wireless transmitter according to another embodiment will be described below. The illustrated wireless transmitter 300 includes N integrated circuits, each having separate local oscillators. The illustrated wireless transmitter 300 includes first to N-th integrated circuits 310a-310n, a processor 320, first to N-th antenna elements 130a-130n, and first to N-th directional couplers 250a-250n.

In one embodiment, each of the integrated circuit 310a-310n can include components similar to those of the first integrated circuit 210a and the second integrated circuit 210b of FIG. 2. In other embodiments, one or more of the integrated circuits 310a-310n can include additional components from the integrated circuits of FIG. 2 or different electrical coupling than the integrated circuits of FIG. 2. Each integrated circuit 310a-310n of FIG. 3 includes a separate local oscillator. Because these local oscillators are separate from each other and have a random phase, these local oscillators may not have the same phase as one another.

The first integrated circuit 310a provides an RF output to the first antenna element 130a. An output of the first integrated circuit 310a is electrically coupled to an input of the first directional coupler 250a. The first directional coupler 250a can RF sample a portion of the power that travels between the RF output of the first integrated circuit 310a and the first antenna element 130a. The first directional coupler 250a provides the RF sampled portion of the power to an RF input of the second integrated circuit 310b.

Similarly, the second integrated circuit 310b provides an RF output to the second antenna element 130b. An output of the second integrated circuit 310b is electrically coupled to an input of the second directional coupler 250b. The second directional coupler 250b can RF sample a portion of the power that travels between the RF output of the second integrated circuit 310b and the second antenna element 130b. The second directional coupler 250b provides the RF sampled portion of the power to an RF input of the third integrated circuit (not illustrated).

Similar connections are provided up to the N-th integrated circuit 310n. The N-th integrated circuit 310n provides an RF output to the N-th antenna element 130n. The N-th directional coupler 250n can RF sample a portion of the power that travels between the RF output of the N-th integrated circuit 310n and the N-th antenna element 130n. The N-th directional coupler 250n provides the RF sampled portion of the power to an RF input of the first integrated circuit 310a.

A baseband output from each integrated circuit 310a-310n is provided to the processor 320. Each of the baseband outputs is associated with a phase difference. For example, the baseband output of the first integrated circuit 310a can include a phase component of $\Phi_1-\Phi_N$, where $\Phi_1$ represents the phase of the local oscillator on the first integrated circuit 310a, and $\Phi_N$ represents the phase of the local oscillator on the N-th integrated circuit 310n. A phase component $\Phi_1$ can be introduced by downconverting the RF input to the first integrated circuit 310a using the local oscillator of the first integrated circuit 310a. Another phase component $\Phi_N$ can be introduced by upconverting a baseband data signal to RF using the local oscillator of the N-th integrated circuit 310n. As another example, the baseband output of the second integrated circuit 310b can include a phase component of $\Phi_2-\Phi_1$, where $\Phi_2$ represents the phase of the local oscillator on the second integrated circuit 310b and $\Phi_1$ represents the phase of the local oscillator on the first integrated circuit 310a.

Each of the baseband outputs will also include a phase component of $\Phi_{Det}$, which represents a delay of the RF input signals provided to receivers on each integrated circuit. However, the integrated circuits 310a-310n, the antenna elements 130a-130n, and the directional couplers 250a-250n can be configured such that the delay is substantially equal for each of the baseband outputs provided to the processor 320. In such a configuration, the phase shift of $\Phi_{Det}$ can be ignored because the phase of each RF output provided to the antenna elements 130a-130n can be synchronized via a phase shift of a phase difference between local oscillators.

The processor 320 serves to determine the phase differences between phases of the separate local oscillators. The baseband outputs from the integrated circuits 310a-310n provide N equations, for which N unknown phase differences can be solved to synchronize the phase associated with each RF output signal. N equations with N unknowns can be solved a number of ways. For example, a first variable can be solved for in terms of the other variable(s) and then substituted in other equation (s). Such a process can be repeated until each variable is determined. As another example, matrix computations can solve for the system of equations, for example, using Gaussian elimination or multiplication by inverse matrices.

There are a number of ways to use the phase differences to synchronize the phase of the RF outputs of each integrated circuit 310a-310n. For example, with N=3, a phase difference between the phase of the local oscillator for the first integrated circuit 310a and the phase of the local oscillator for the second integrated circuit 310b can be computed by the processor 320. This phase difference can then be used to control the phase shift of the RF output of the second integrated circuit to synchronize the phase with the phase of the RF output of the first integrated circuit. As mentioned above in reference to FIG. 2, this can be implemented using a phase shifter that receives a signal indicative of a phase difference and shifts a signal in a transmission path by the phase difference. Similarly, a phase difference between the phase of the local oscillator for the first integrated circuit 310a and the phase of the local oscillator for the third integrated circuit 310n can be computed by the processor 320. This phase difference can then be used to control the phase shift of the RF output of the third integrated circuit 310n to synchronize in phase with the phase of the RF output of the first integrated circuit 310a. Accordingly, the phase of each RF output will be synchronized in this example.

The principles described above in connection with FIG. 2 and FIG. 3 can be applied to integrated circuits that include two or more transmission paths that serve to provide signals to two or more antenna elements.

Figure 4:
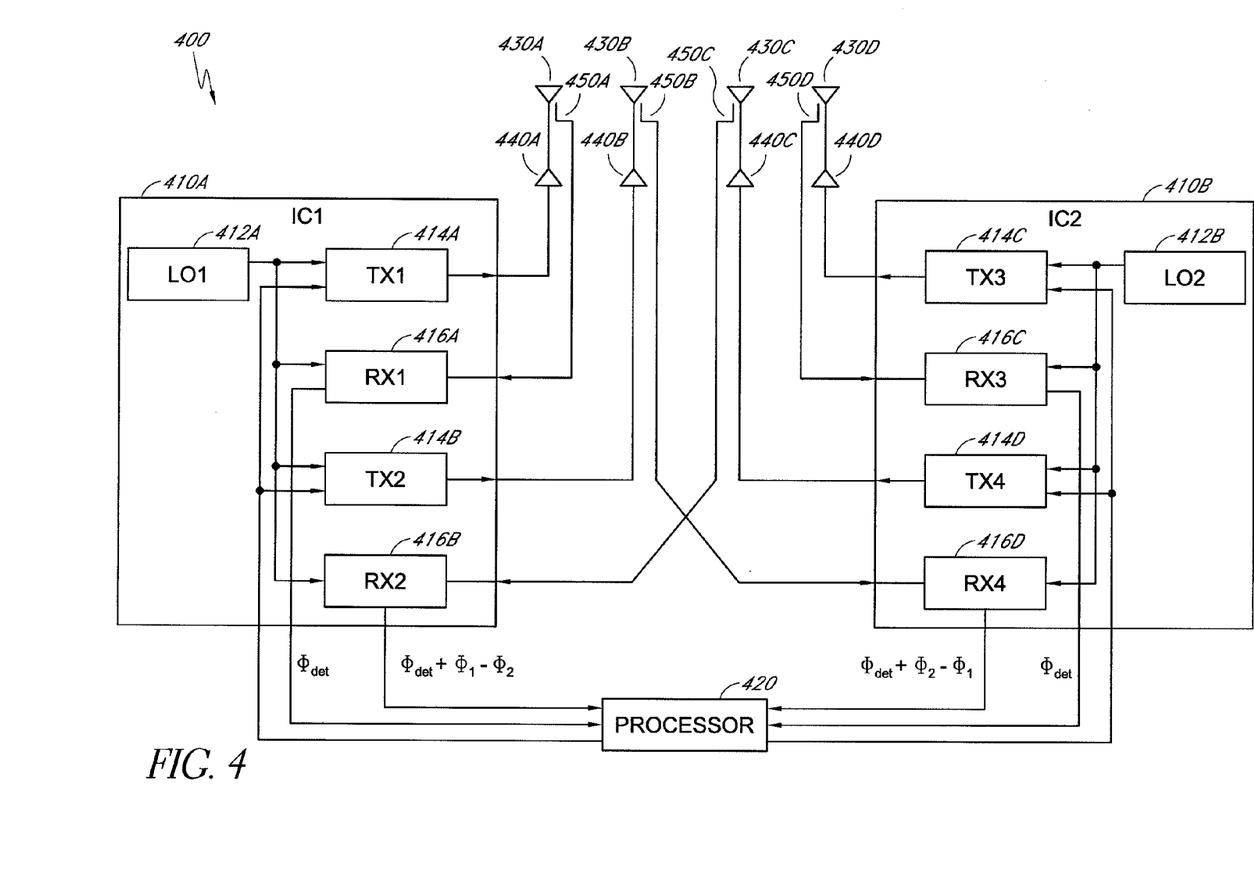
FIG. 4 is a block diagram of yet another embodiment of a wireless transmitter having separate local oscillators for multiple transmission paths.

Referring to FIG. 4, a wireless transmitter according to one embodiment will be described below. The illustrated wireless transmitter 400 includes two integrated circuits 410a, 410b each having separate local oscillators and two transmission paths. The illustrated wireless transmitter 400 includes a first integrated circuit 410a, a second integrated circuit 410b, a processor 420, first to fourth antenna elements 430a-430d, first to fourth signal amplifiers 440a-440d, and first to fourth directional couplers 450a-450d.

The first integrated circuit 410a can include a first local oscillator 412a, a first transmission path 414a, a second transmission path 414b, a first receiver 416a, and a second receiver 416b.

The first local oscillator 412a serves to provide a periodic signal that can be mixed with one or more data signals provided to the first transmission path 414a and the second transmission path 414b. For example, the first local oscillator 412a can provide a periodic signal to the first receiver 416a for downconverting an RF signal. As another example, the first local oscillator 412a can provide a periodic signal to the first transmission path 414a for upconverting a baseband signal to RF. A phase $\Phi_1$ of the first local oscillator 412a can be random, and can be anywhere from between 0 to $2\pi$ radians or 0° to 360°.

An output of the first transmission path 414a is electrically coupled to the first antenna element 430a via the first signal amplifier 440a. Similarly, an output of the second transmission path 414b is electrically coupled to the second antenna element 430b via the second signal amplifier 440b. The output of the first transmission path 414a and the output of the second transmission path 414b can have a phase component of $\Phi_1$.

An input of the first receiver 416a is electrically coupled to an output of the first directional coupler 450a. The first receiver 416a can downconvert an RF sampled signal provided by the first directional coupler 450a to baseband. A first baseband output of the first receiver 416a can be coupled to a first input of the processor 420. The first baseband output can have a phase component of $\Phi_{Det}$.

An input of the second receiver 416b is electrically coupled to an output of the third directional coupler 450c. The second receiver 416b can downconvert an RF sampled signal provided by the third directional coupler 450c to baseband. A second baseband output of the second receiver 416b can be coupled to a second input of the processor 420. The second baseband output can have a phase component of $\Phi_{Det}+\Phi_1-\Phi_2$. $\Phi_{Det}$ can represent a phase shift introduced by the delay of an RF signal from any of the outputs of the directional couplers to the input of the receiver that it is electrically coupled to in FIG. 4. $\Phi_1$ can represent the phase shift introduced by the second receiver 416b downconvert the RF signal to baseband. $\Phi_2$ can represent the phase shift introduced by a fourth transmission path 414d that upconverts the input signal(s) to RF. In an alternative embodiment, only one of the first receiver 416a or the second receiver 416b downconverts an RF signal to baseband, and provides the baseband output to the processor 420.

In the illustrated embodiment, the configuration of the second integrated circuit 410b is substantially the same as that of the first integrated circuit 410a. As such, corresponding parts perform substantially the same function. The second integrated circuit 410b can include a second local oscillator 412b, a third transmission path 414c, a fourth transmission path 414d, a third receiver 416c, and a fourth receiver 416d. A phase $\Phi_2$ of the second local oscillator 412b can be random, and can be anywhere from between 0 to $2\pi$ radians or 0° to 360°.

An output of the third transmission path 414c is electrically coupled to the fourth antenna element 430d via the first signal amplifier 440d. Similarly, an output of the fourth transmission path 414d is electrically coupled to the third antenna element 430c via the third signal amplifier 440c. The output of the third transmission path 414c and the output of the fourth transmission path 414d can have a phase component of $\Phi_2$.

An input of the third receiver 416c is electrically coupled to an output of the fourth directional coupler 450d. The third receiver 416c can downconvert an RF sampled signal provided by the fourth directional coupler 450d to baseband. A third baseband output of the third receiver 416a can be coupled to a third input of the processor 420. The third baseband output can have a phase component of $\Phi_{Det}$.

An input of the second receiver 416d is electrically coupled to an output of the second directional coupler 450b. The fourth receiver 416d can downconvert an RF sampled signal provided by the second directional coupler 450b to baseband. A fourth baseband output of the fourth receiver 416d can be coupled to a fourth input of the processor 420. The fourth baseband output can have a phase component of $\Phi_{Det}+\Phi_2-\Phi_1$. $\Phi_{Det}$ can represent a phase shift introduced by the delay of an RF signal from any of the outputs of the directional couplers to the input of the receiver that it is electrically coupled to in FIG. 4. $\Phi_2$ can represent the phase shift introduced by the fourth receiver 416d that downconverts an RF signal to baseband. $\Phi_1$ can represent the phase shift introduced by a second transmission path 414b modulating input signal(s) to RF. In an alternative embodiment, only the third receiver 416c or the fourth receiver 416d downconverts an RF signal to baseband, and provides the baseband output to the processor 420.

The processor 420 can perform computations on at least a portion of the first baseband output, the second baseband output, the third baseband output, and the fourth baseband output. The processor 420 can be any suitable processor having computational capacity to process the baseband output signals and determine a phase difference between the phase $\Phi_1$ of the first local oscillator 412a and the phase $\Phi_2$ of the second local oscillator 412b. The processor 420 can also perform other operations for the first integrated circuit 410a and/or the second integrated circuit 410b.

In the illustrated embodiment, the processor 420 can determine a phase component of the first baseband output ($\Phi_{Det}$) and a phase component of the second baseband output ($\Phi_{Det}+\Phi_1-\Phi_2$). Then, the processor can subtract these values to compute a phase difference $\Phi_1-\Phi_2$. The processor 420 can then provide a signal representative of the phase difference $\Phi_1-\Phi_2$ to the first integrated circuit 410a and the second integrated circuit 410b. The signal representative of the phase difference can be used to shift the phase of the signals provided to the first antenna element 430a and the second antenna element 430b so that they are synchronized in phase with the signals provided to the third antenna element 430c and the fourth antenna element 430d. Alternatively, the signal representative of the phase difference can be used to shift the phase of the signals provided to the third antenna element 430c and the fourth antenna element 430d so that they are synchronized in phase with the signals provided to the first antenna element 430a and the second antenna element 430b.

Further, the processor 420 can determine a phase component of the second baseband output ($\Phi_{Det}+\Phi_1-\Phi_2$) and a phase component of the fourth baseband output ($\Phi_{Det}+\Phi_2-\Phi_1$). Then the processor 420 can subtract these values and divide by two to compute a phase difference $\Phi_1-\Phi_2$. The processor 420 can then provide a signal representative of the phase difference $\Phi_1-\Phi_2$ to the first integrated circuit 410a and/or the second integrated circuit 410b. The signal representative of the phase difference can be used to shift the phase of the signals provided to the first antenna element 430a and the second antenna element 430b so that they are synchronized in phase with the signals provided to the third antenna element 430c and the fourth antenna element 430d. Alternatively, the signal representative of the phase difference can be used to shift the phase of the signals provided to the third antenna element 430c and the fourth antenna element 430d so that they are synchronized in phase with the signals provided to the first antenna element 430a and the second antenna element 430b.

The processor 420 can perform a number of similar computations and adjust the phase of the signals provided to the antenna elements so that they are synchronized in phase. In some embodiments, not all signals provided to the processor 420 may be required to compute the phase difference $\Phi_1-\Phi_2$. Alternatively or additionally, the processor 420 may provide a signal indicative of the phase difference to only the first integrated circuit 410a or the second integrated circuit 410b.

Receivers

Referring back to FIGS. 2-4, receivers can be used in determining a phase difference between two or more separate and unrelated local oscillators. Such receivers can preserve the relationship between a phase of each of the separate and unrelated local oscillators. Suitable receivers can have a gain independent of frequency. In addition, suitable receivers can have a gain independent of temperature. With temperature and frequency independent gain, the receiver can be used to measure power as well as the phase difference between two local oscillators. One example of a receiver that can be used in connection with the embodiments discussed above is disclosed in U.S. Pat. No. 7,418,244, the entire disclosure of which is hereby incorporated by reference.

Figure 5:
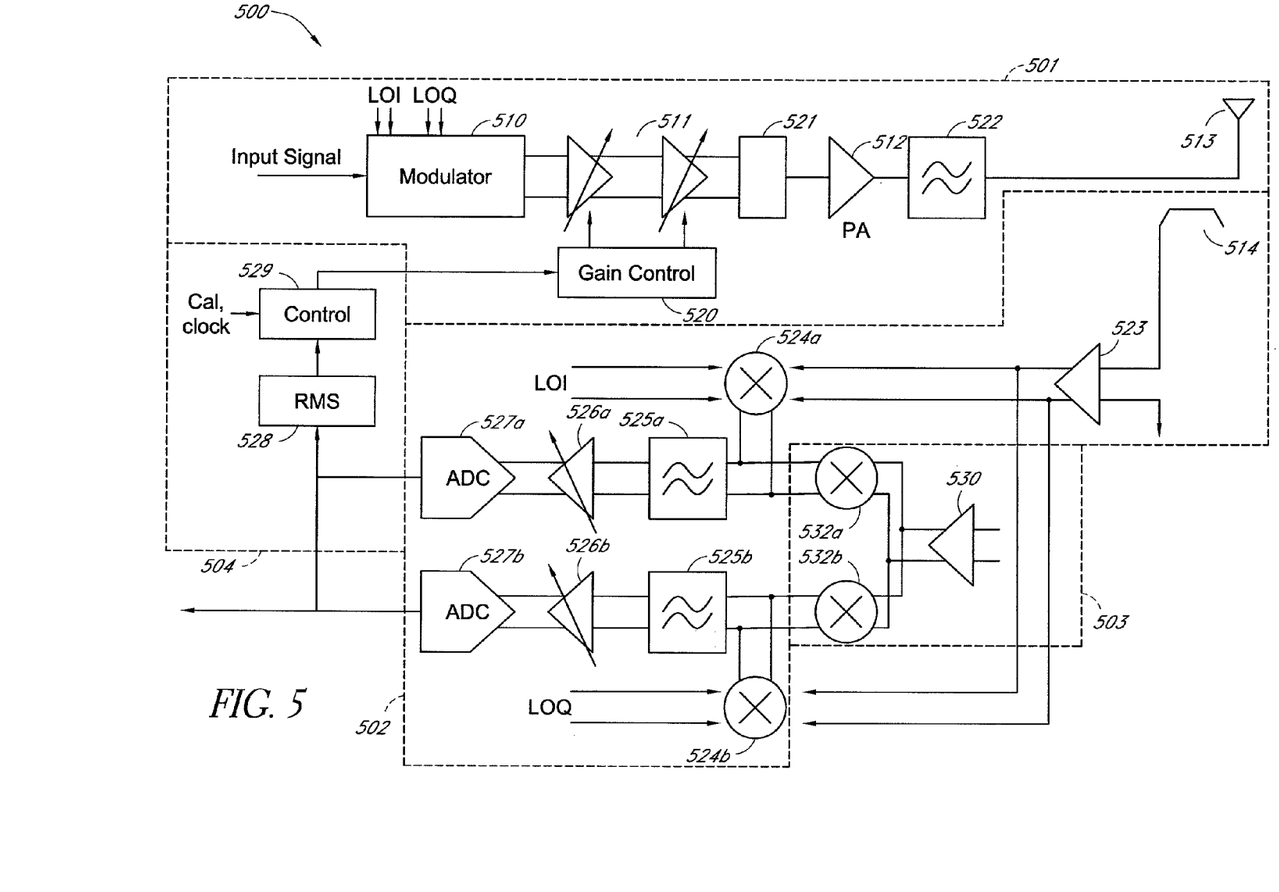
FIG. 5 is a block diagram of an example transceiver having a receiver for calculating a phase difference between transmission paths.

Referring to FIG. 5, one embodiment of a transceiver that can include a receiver to monitor the transmitter will be described below. The illustrated transceiver 500 includes a transmitter 510, 511, 521, 512, 522, a main receiver down converter 530, 532, a transmit detector down converter 523, 524 and a receiver baseband path 525, 526, 527. In some systems (TDD systems, for example), either the receiver or transmitter is active at any time, that is, both the receiver and transmitter are not active at the same time. In these systems, the receive baseband path can be shared by the main receive path and the transmit detector path. The transmit detector receiver front end 523, 524 can differ from the main receiver front end 530, 532 in that it can be optimized to receive a large signal rather than the very small signal levels that receivers typically need to receive. The transmit detector receiver that can be used to detect phase differences, using a down converter plus the baseband portion of the receive path, which is typically idle while transmitting in TDD systems. The illustrated embodiment includes a transmit path 501, a detection circuit 502, a receive path 503, and a control block 504.

The transmit path 501 can include modulator 510, a variable gain amplifier (VGA) 511, a bandpass filter 521, a power amplifier (PA) 512, a gain control 520, an output filter 522, and an antenna 513. The transmit path 501 can correspond to a transmission path as described in above in connection with any of FIGS. 1-4. The baseband modulator 510 generates a modulated RF signal and provides the modulated RF signal to a two-stage variable gain amplifier (VGA) 511. The VGA 511 serves to amplify the modulated RF signal in response to input from the gain control 520. The output of the VGA 511 is electrically coupled to the bandpass filter 521, which serves to filter out a desired frequency range. The power amplifier 512 serves to amplify an input provided by the bandpass filter 521. The output filter 522 serves to filter an output of the power amplifier 512 and provide an RF signal to an input of the antenna 513.

The detection circuit 502 can include a directional coupler 514, downconverter input amplifier 523a, transmit detect downconverters 524a, 524b, baseband filters 525a, 525b, baseband VGAs 526a, 526b, and analog to digital converters (ADC) 527a, 527b. The directional coupler 514 serves to sample a portion of the RF signal provided to the antenna 513. An output of the directional coupler 514 serves to drive a transmit detect downconverter stage that includes the downconverter input amplifier 523 and the power detect downconverter 524a.

In one embodiment, a first downconverter input amplifier 523, a first transmit detect downconverter 524a, a first baseband filter 525a, a first baseband VGA 526a, and a first ADC 527a can correspond to an I path. In the same embodiment, a second downconverter input amplifiers 523b, a second transmit detect downconverter 524b, a second baseband filter 525b, a second baseband VGA 526b, and a second ADC 527b can correspond to a Q path.

The downconverter input amplifier 523 and downconverters 524a, 524b can correspond to at least a portion of the receivers 216a, 216b of FIG. 2 and/or the receivers 416a, 416b, 416c, 416d of FIG. 4. The receivers 216a, 216b of FIG. 2 and/or the receivers 416a, 416b, 416c, 416d of FIG. 4 can also include additional components, including one or more of the baseband filter 525a, 525b, the baseband VGA 526a, 526b, and the ADC 527a, 527b.

In one embodiment, a digital outputs of the ADC 527a and ADC 527b can be provided to the processor 220 of FIG. 2, the processor 320 of FIG. 3, or the processor 420 of FIG. 4. In another embodiment, an output another component of the detection circuit 502 can be provided to the processor 220 of FIG. 2, the processor 320 of FIG. 3, or the processor 420 of FIG. 4. The skilled artisan will appreciate that there are a number of nodes in FIG. 5 from which baseband signals can be provided to a processor to determine a phase difference.

In one embodiment of the detection circuit 502, a downconverter 532a, 532b of the receive path 503 can be used. The following description will be provided for the I path, although the Q path can have substantially the same functionality. The output of the transmit detect downconverter 524a is electrically coupled to one of the receiver's baseband paths where it is filtered by the baseband filter 525a and amplified by the baseband VGA 526a. The output of baseband VGA 526a is digitized by the ADC 527a. The digital output of the ADC 527a is provided to an input of the control block 504.

A transmit detect signal provided by the directional coupler 514 to the downconverter input amplifier 523 can be relatively large, for example, on the order of –15 dBm in one embodiment at maximum output power. Thus, no gain may be needed in downconversion. In one embodiment, a gain of the downconverter input amplifier 523 is –6 dB, and the conversion gain of the downconverter 524a is –10 dB. Since the downconverter input amplifier 523 can have loss, a resistive load having a small resistance can be used such that the bandwidth is wide. This approach decreases the frequency dependence of the downconverter stage to relatively small levels, even at very high frequency. In addition, resistively loaded circuits can be designed with a gain that is a function of the ratio of two or more resistors. The result is a predictable and constant gain, which can minimize or even eliminate calibration requirements.

In one embodiment, the downconverter 524a has a transconductance of around 3.2 milliSiemens, which can result in a maximum gain of 19.7 dB when loaded by the variable transimpedance baseband VGA 526a. The receiver baseband gain can be set so that the ADC 527a does not clip under maximum input-level conditions and so that adequate signal-to-noise ratio (SNR) can be maintained over the transmit output power range. The maximum input level at the input to the downconverter input amplifier 523 can be around –15 dBm. For example, an additional 16 dB of headroom can be provided (10 dB for the peak-to-average, 3 dB for uncertainty in the detector path gain and another 3 dB for uncertainty in the coupler loss). Thus, the receiver baseband gain is set so that the inputs to the ADCs 527 can be 16 dB below the clipping level with about –15 dBm of input power. This condition is met with the receiver baseband gain set to about –9 dB. Operation can get close to the desired gain at about 30 dB below maximum gain.

As the output power is decreased, the SNR of the detected power can be decreased as well. To ensure an accurate measure of transmitted power, SNR can be kept above about 20 dB nominally. For example, for 15 dB of output power reduction, the receiver baseband gain can be increased by 15 dB in order to maintain adequate SNR.

The receive path 503 can include a receive input amplifier 530, a first receive downconverter 532a, a second receive downconverter 532b, and a second baseband filter 525b. The receive input amplifier 530 serves to amplify an input signal and provide an output to the first receive downconverter 532a and the second receive downconverter 532b. The first receive downconverter 532a and the second receive downconverter 532b each serves to covert their respective input signals down to baseband and provide baseband signals for further processing in the receiver.

The control block 504 can include a root mean squared (RMS) circuit 528 and a control block 529. The RMS circuit serves to generate the root mean square output from an output of the ADC 527. The root mean square output is provided to the control block that serves to control the gain control 520, which in turn generates a control signal for the transmitter two stage VGA 511. This can serve to reduce or minimize a difference between the digital power detect signal from the ADC 527 and a reference signal input to the control block 529.

Figure 6:
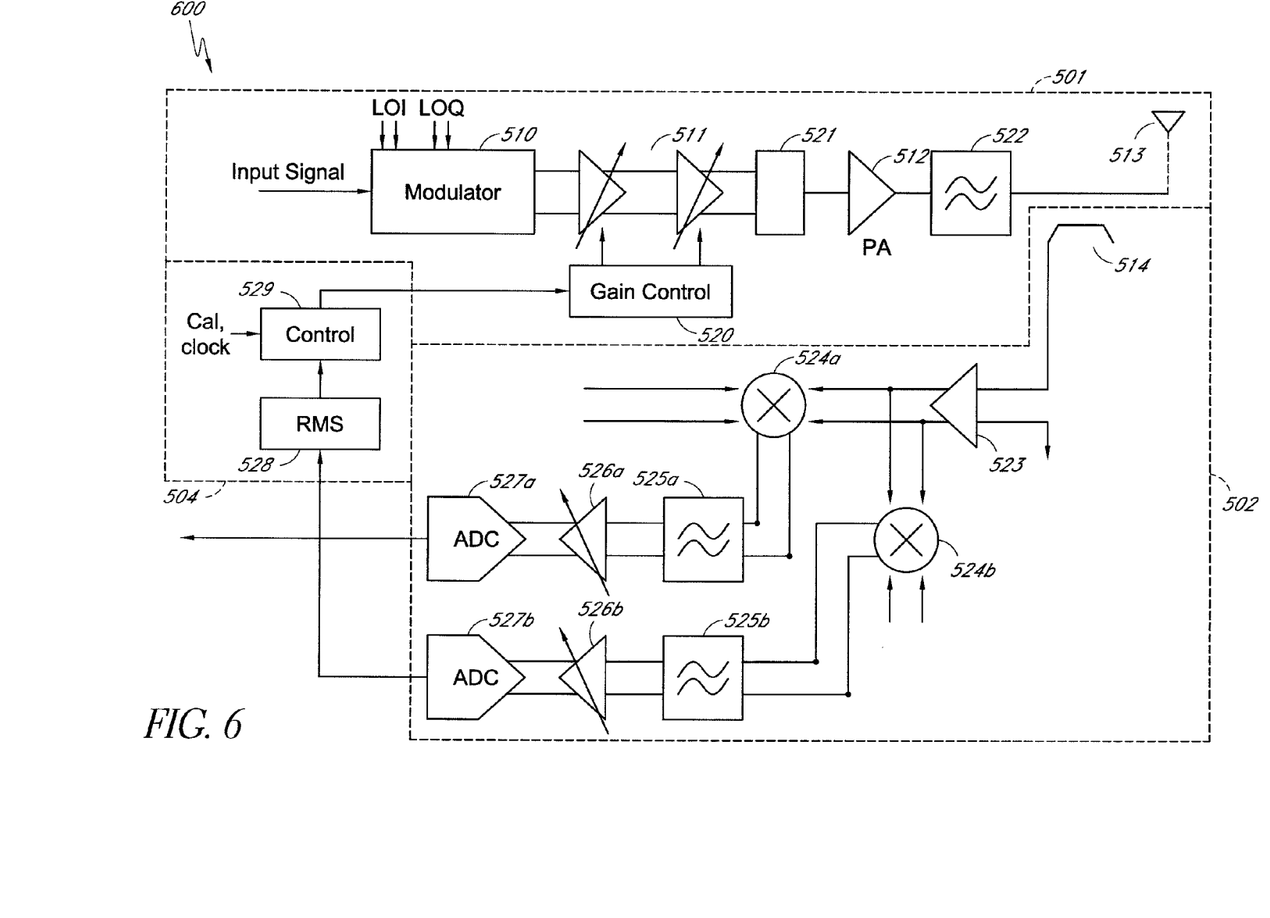
FIG. 6 is a block diagram of another example transceiver having a receiver for calculating a phase difference between transmission paths.

Referring to FIG. 6, one embodiment of a transmitter that can be used to detect a phase difference will be described below. The illustrated transmitter 600 is substantially the same as the transceiver of FIG. 5 except that the transmitter 600 does not have a receive path 503 (FIG. 5). The illustrated transmitter 600 includes a transmit path 501, a detection circuit 502, and a control block 504. Each of these components is substantially the same as described earlier in connection with FIG. 5.

The transmit path 501 serves to output RF signals from an antenna element 513. The detection circuit 502 serves to RF sample a portion of the RF power provided to the antenna element and to provide a digital signal to the control block 504. An output of the detection circuit 502 can be provided to a processor to determine a phase difference between RF signals. However, unlike the transceiver 500 of FIG. 5, the components of the transmitter 600 are not used for receiving RF signals aside from those from the directional coupler 514.

Like the transceiver of FIG. 5, the transmitter of FIG. 6 can be used, in part or in its entirety, in connection with the principles described in reference to the embodiments of one or more of FIGS. 2-4.

APPLICATIONS

In the embodiments described above, systems to determine phase differences and synchronize phases were described in conjunction with particular embodiments. A skilled artisan will, however, appreciate that the principles and advantages of the embodiments can be used for any other systems, apparatus, or method that has needs for determining a phase difference or synchronizing phase. This includes, but is not limited to, any communication system with two or more separate and unrelated local oscillators configured to transmit signals representative of a common input signal. Examples of such systems include wireless systems including multiple antenna elements, such as multiple input multiple output (MIMO) systems.

Such phase synchronization methods, systems, and/or apparatus can be implemented into various electronic devices. Examples of the electronic devices can include, but are not limited to, consumer electronic products, parts of the consumer electronic products, electronic test equipments, etc. Examples of the electronic devices can also include memory chips, memory modules, circuits of optical networks or other communication networks, and disk driver circuits. The consumer electronic products can include, but are not limited to, wireless devices, a mobile phone, cellular base stations, a telephone, a television, a computer monitor, a computer, a hand-held computer, a personal digital assistant (PDA), a microwave, a refrigerator, a stereo system, a cassette recorder or player, a DVD player, a CD player, a digital video recorder (DVR), a VCR, an MP3 player, a radio, a camcorder, a camera, a digital camera, a portable memory chip, a washer, a dryer, a washer/dryer, a copier, a facsimile machine, a scanner, a multi functional peripheral device, a wrist watch, a clock, etc. Further, the electronic device can include unfinished products.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

What is claimed is:

1. An apparatus comprising:
   a first integrated circuit comprising:
   a local oscillator configured to generate a local oscillator output signal;
   a transmit path having a phase control input, the transmit path being configured to receive the local oscillator output signal as an input, to generate a first radio frequency (RF) output signal based at least partly on the local oscillator output signal, and to provide the first RF output as an output of the first integrated circuit, wherein a phase of the first RF output signal is controllable based at least partly on a control input provided to the phase control input; and
   a receive path configured to receive the local oscillator output signal and a receive signal as inputs, wherein an input of the first integrated circuit is configured to receive the receive signal, wherein the receive signal is RF sampled from a second RF output signal having a phase component that is independent of the phase of the first RF signal, wherein the receive path is configured to generate a signal having a phase component that includes a relative phase difference between the first RF signal and the second RF signal as an output.

2. The apparatus of claim 1, wherein the first integrated circuit further comprises:
   a second transmit path configured to receive the local oscillator output signal as an input and to generate the third RF output signal based at least partly on the local oscillator output signal; and
   a second receive path configured to receive the local oscillator output signal a second receive signal as inputs, wherein the receive signal is RF sampled from the first RF output signal.

3. The apparatus of claim 1, further comprising a first directional coupler coupled to the second RF output signal, wherein the first directional coupler is configured to generate the receive signal.

4. The apparatus of claim 1, wherein the transmit path comprises a processor configured to phase shift one or more signals digitally based at least partly on the control input provided to the phase control input, wherein the phase of the first RF output signal is based at least partly on the digitally shifted phase.

5. The apparatus of claim 1, wherein the first integrated circuit comprises a second receive path configured to receive the local oscillator output signal and a second receive signal as inputs, wherein the second receive signal is RF sampled from the first RF output signal.

6. The apparatus of claim 5, further comprising:
   a first directional coupler coupled to the first RF output signal, wherein the first directional coupler is configured to generate the second receive signal;
   a second directional coupler coupled to a second RF output signal, wherein the second directional coupler is configured to generate the receive signal;
   a second local oscillator separate from the local oscillator, wherein the second local oscillator is configured to generate a second local oscillator output signal, and wherein the second local oscillator is embodied on a second integrated circuit; and
   a second transmit path configured to receive the second local oscillator output signal as an input and to generate the second RF output signal based at least partly on the second local oscillator output signal.

7. The apparatus of claim 5, further comprising a first directional coupler coupled to the first RF output signal and a second directional coupler coupled to the second RF output signal, wherein the first directional coupler is configured to generate the second receive signal and the second directional coupler is configured to generate the receive signal.

8. The apparatus of claim 1, wherein the receive path is configured to downconvert the receive signal from RF to baseband based at least partly on the local oscillator output.

9. The apparatus of claim 1, wherein the receive path includes a quadrature path and an in-phase path.

10. The apparatus of claim 1, wherein the transmit path is configured to upconvert a baseband signal to RF based at least partly on the local oscillator output.

11. An apparatus comprising:
    a local oscillator configured to generate a local oscillator output signal;
    a transmit path having a phase control input, the transmit path being configured to receive the local oscillator output signal as an input and to generate a first radio frequency (RF) output signal based at least partly on the local oscillator output signal, wherein a phase of the first RF output signal is controllable based at least partly on a control input provided to the phase control input;

a receive path configured to receive the local oscillator output signal and a receive signal as inputs, wherein the receive signal is RF sampled from a second RF output signal, wherein the receive path is configured to generate a signal having a phase component that includes a relative phase difference between the first RF signal and the second RF signal as an output;

a first directional coupler coupled to the first RF output signal, wherein the first directional coupler is configured to generate a second receive signal;

a second directional coupler coupled to a second RF output signal, wherein the second directional coupler is configured to generate the receive signal for the receive path;

a second local oscillator separate from the local oscillator, wherein the second local oscillator is configured to generate a second local oscillator output signal;

a second transmit path configured to receive the second local oscillator output signal as an input and to generate the second RF output signal based at least partly on the second local oscillator output signal; and a second receive path configured to receive the second local oscillator output signal and the second receive signal as inputs, wherein the second receive path is configured to generate an output signal having a phase component that includes a relative phase difference between the second local oscillator output signal and the second receive signal.

12. The apparatus of claim 11, further comprising a processor coupled to outputs of the receive path and the second receive path, wherein the processor is configured to determine the relative phase difference using the outputs of the receive path and the second receive path, and to adjust at least the phase of the first RF output signal via the phase control input of the transmit path.

13. The apparatus of claim 11, further comprising a processor coupled to outputs of the receive path and the second receive path, wherein the processor is configured to determine the relative phase difference using the outputs of the receive path and the second receive path and to adjust the phase of the first RF output signal based at least partly on the relative phase difference, and wherein the transmit path comprises the processor.

14. The apparatus of claim 11, wherein the local oscillator, the transmit path, and the receive path are embodied in a first integrated circuit, and wherein the second local oscillator, the second transmit path, and the second receive path are embodied in a second integrated circuit separate from the first integrated circuit.

15. The apparatus of claim 11, wherein the local oscillator, the transmit path, the receive path, the second local oscillator, the second transmit path, and the second receive path are embodied in a single integrated circuit.

16. An apparatus comprising:
a local oscillator configured to generate a local oscillator output signal;
a transmit path having a phase control input, the transmit path being configured to receive the local oscillator output signal as an input and to generate a first radio frequency (RF) output signal based at least partly on the local oscillator output signal, wherein a phase of the first RF output signal is controllable based at least partly on a control input provided to the phase control input;
a receive path configured to receive the local oscillator output signal and a receive signal as inputs, wherein the receive signal is RF sampled from a second RF output signal, wherein the receive path is configured to generate a signal having a phase component that includes a relative phase difference between the first RF signal and the second RF signal as an output;
a first directional coupler coupled to the first RF output signal, wherein the first directional coupler is configured to generate a second receive signal;
an N-th directional coupler coupled to an N-th RF output signal, wherein the N-th directional coupler is configured to generate the receive signal for the receive path;
an N-th local oscillator separate from the local oscillator, wherein the N-th local oscillator is configured to generate an N-th local oscillator output signal;
an N-th transmit path configured to receive the N-th local oscillator output signal as an input and to generate the N-th RF output signal based at least partly on the N-th local oscillator output signal; and
an N-th receive path configured to receive the N-th local oscillator output signal and an N-th receive signal as inputs, wherein the N-th receive signal is not the second receive signal, wherein the receive path is configured to generate an output signal having a phase component that includes relative phase difference between the N-th local oscillator output signal and the N-th receive signal.

17. A method of deriving a relative phase difference, the method comprising:
generating a first RF signal in a transmission path based at least partly on a first local oscillator output signal;
providing an RF sample of the first RF signal to a receive path using a directional coupler;
generating a first baseband signal in the receive path based at least partly on the RF sample of the first RF signal and a second local oscillator output signal, wherein the second local oscillator output signal and the first, local oscillator output signal are generated from separate local oscillators;
generating a second RF signal in a second transmission path based at least partly on the second local oscillator output signal;
providing an RF sample of the second RF signal to a second receive path using a second directional coupler; and
generating a second baseband signal in the second receive path based at least partly on the RF sample of the second RF signal;
deriving, using a processor, a relative phase difference between the first local oscillator output and the second local oscillator output based at least partly on the first baseband signal and the second baseband signal.

18. The method of claim 17, further comprising using a phase shifter to adjust the phase of the first RF signal based at least partly on the relative phase difference.

19. The method of claim 18, wherein the phase shifter is implemented in the processor.

20. The method of claim 17, wherein the second baseband signal is based at least partly on the second local oscillator output.

21. The method of claim 17, wherein a non-transitory computer-readable storage media stores instructions for the deriving.

22. An apparatus comprising:
a local oscillator configured to generate a local oscillator output signal;
means for transmitting an RF signal having means for controlling a phase of the RF signal and means for upconverting a baseband signal to RF based at least partly on the local oscillator input;

means for receiving a second RF signal having means for generating a signal with a phase component that includes a relative phase difference between the RF signal and the second RF signal; and antenna elements comprising a first antenna element associated with the first RF signal and a second antenna element associated with the second RF signal, wherein the antenna elements are configured to generate a directional beam in a selected direction based at least partly on the phase of the RF signal and a second phase of the second RF signal.

* * * * *

UNITED STATES PATENT AND TRADEMARK OFFICE
CERTIFICATE OF CORRECTION

| | |
|---|---|
| PATENT NO. | : 8,712,356 B2 |
| APPLICATION NO. | : 12/777412 |
| DATED | : April 29, 2014 |
| INVENTOR(S) | : Montalvo et al. |

It is certified that error appears in the above-identified patent and that said Letters Patent is hereby corrected as shown below:

IN THE CLAIMS:

In column 18 at line 35, in Claim 17, change "first," to --first--.

Signed and Sealed this
Second Day of December, 2014

Michelle K. Lee
*Deputy Director of the United States Patent and Trademark Office*